United States Patent Office 3,215,753
Patented Nov. 2, 1965

3,215,753
SELECTIVE ISOMERIZATION OF NEOHEXANE
Herman S. Bloch, Skokie, and Vladimir Haensel, Hinsdale, Ill., assignors to Universal Oil Products Company, Des Plaines, Ill., a corporation of Delaware
No Drawing. Filed Aug. 15, 1963, Ser. No. 302,455
10 Claims. (Cl. 260—683.74)

This invention relates to a process for the production of 2,3-dimethylbutane.

An object of this invention is to provide a novel selective isomerization process for preparing 2,3-dimethylbutane.

A further object of this invention is to provide a novel selective isomerization process for preparing 2,3-dimethylbutane from a starting material which comprises neohexane.

Production of highly-branched chain paraffin hydrocarbons having high anti-knock properties and therefore suitable for use in automotive and aviation fuels is of considerable importance in the petroleum refining industry. Furthermore, the introduction of automobile engines of high compression ratio has necessitated the utilization of high anti-knock fuels in these engines to obtain maximum horsepower output therefrom. Thus, the demand for higher and higher octane number fuels has led to the need for increased quantities of highly-branched chain paraffinic hydrocarbons of high anti-knock values. A convenient source of such highly-branched chain paraffinic hydrocarbons is the catalytic isomerization of less highly-branched chain paraffinic hydrocarbons. Normal butane, normal pentane and normal hexane have been isomerized to isobutane, isopentane and various hexane fraction products, respectively, by various prior art processes utilizing either liquid or vapor phase. However, it is well known in the art that cracking occurs along with isomerization and that this cracking increases with increasing molecular weight of the hydrocarbon reactant. A process for the isomerization of neohexane is therefore particularly attractive when it is realized that the neohexane can be converted by proper selective isomerization into a high anti-knock hydrocarbon fraction. It is therefore an object of this invention to provide such a process which will yield the desired 2,3-dimethylbutane high octane hexane isomer.

Prior art processes for the isomerization of saturated hydrocarbons have taught the utilization of various catalytic agents to accelerate the desired molecular rearrangement at the conditions selected. Ordinarily, the catalytic agents utilized have comprised metal halides such as aluminum chloride, aluminum bromide, etc., which were activated by addition of the respective hydrogen halide thereto. These catalytic agents are very active and effect high conversions per pass. However, this high activity is accompanied by many disadvantages. One of the greatest disadvantages is the fact that these catalytic materials not only accelerate isomerization reactions, but they also induce decomposition reactions. These decomposition reactions are particularly detrimental to the overall economics of an isomerization process since they cause a loss of a portion of the charging stock as well as increasing catalyst consumption by the reaction of fragmental material with the catalytic agent to form sludge-like materials. The process of the present invention overcomes these disadvantages by utilization of more recently developed catalysts, and thus, the use of the process along with these catalysts results in the attainment of a selective isomerization reaction in which a high octane hexane isomer, namely 2,3-dimethylbutane, is obtained.

As stataed hereinabove, the process of the present invention is particularly directed to the selective isomerization of neohexane. Neohexane (2,2-dimethylbutane) has a boiling point of 49.7° C., an F-1 clear octane number of 92.3, and a leaded octane number (F-1+3 cc. TEL) of 104.0. It may be made by the thermal alkylation of isobutane with ethylene. The desired 2,3-dimethylbutane has a boiling point of 58.0° C., an F-1 clear octane number of 103.5, and a leaded octane number (F-1+3 cc. TEL) of greater than 120.

One embodiment of this invention provides a process for the production of 2,3-dimethylbutane which comprises selectively isomerizing neohexane at isomerization conditions in the presence of an isomerization catalyst.

A further embodiment of this invention provides a process for the production of 2,3-dimethylbutane which comprises selectively isomerizing neohexane at isomerization conditions in the presence of an isomerization catalyst comprising a refractory oxide, a platinum group metal and combined halogen.

A specific embodiment of this invention provides a process for the production of 2,3-dimethylbutane which comprises selectively isomerizing neohexane at isomerization conditions in the presence of an isomerization catalyst comprising alumina, platinum and combined halogen.

We have found that under selective isomerization conditions of low, once-through conversion of neohexane to 2,3-dimethylbutane, the 2,3-dimethylbutane is the primary product of neohexane and the formation of this primary product occurs as a relatively fast reaction, while the subsequent conversion of 2,3-dimethylbutane to 2-methylpentane and 3-methylpentane is considerably slower. As a result, it is possible, by the judicious selection of isomerization catalyst and selective isomerization operating conditions such that relatively low conversions per pass are maintained, to obtain yields of 2,3-dimethylbutane higher than those which correspond to the overall equilibrium yields, although, of course, the 2,3-dimethylbutane-neohexane equilibrium ratio is never exceeded and equilibrium of 2,3-dimethylbutane with the less-branched isomers is never reached.

The clean character of this selective isomerization reaction may be illustrated by the following data:

TABLE I

| Percent neohexane converted: | Mols of 2,3-dimethylbutane formed per 100 mols of neohexane converted |
| --- | --- |
| 5 | 94 |
| 10 | 89 |
| 15 | 84 |
| 20 | 78 |
| 25 | 73 |
| 30 | 67 |
| 40 | 56 |
| 50 | 40 |

It is evident that at conversions less than about 20%, ultimate yields of about 80% or better of 2,3-dimethylbutane may be obtained, while at about 10% conversion, ultimate yields of about 90% or better may be obtained. It is therefore particularly preferred that the percent neohexane converted be limited to less than about 25% in the process of the present invention.

Various isomerization catalysts are utilizable within the generally broad scope of the process of the present invention. These catalysts include a support, an acid-acting function, and a hydrogenation component. The support may be selected from diverse refractory oxides including silica, alumina, silica-alumina, slicia-alumina-magnesia, silica-alumina-zirconia, silica-zirconia, etc. Depending upon the method of preparation and upon the treatment of the support thereafter, these various supports will have surface areas ranging from about 25 to about 500 square meters per gram and are characterized as high-surface supports. In some of the supports, the acid-acting function is inherently present, as when silica-alumina is used as the support. The amount of effectiveness of this acid-acting function is then controlled by the quantity of silica which is combined with the alumina, and by the treatment of the silica-alumina, particularly by calcination, prior to or after compositing the hydrogenation component therewith. Of the various supports, alumina is preferred, and particularly gamma-alumina having a surface area of from about 150 to about 450 square meters per gram. When gamma-alumina is utilized as the support, the acid-acting function can be added to the catalyst by the incorporation therein of what is known in the art as combined halogen. The amount of combined halogen can be varied from about 0.01 to about 8% by weight based on the alumina. Of the various halogens which may be utilized, both fluorine and chlorine can be used satisfactorily. Thus, in an alumina-type catalyst to be utilized at selective isomerization reaction temperatures of from about 300° C. to about 500° C., about 0.3% by weight of fluorine and about 0.3 by weight of chlorine may be incorporated therein. When it is desirable to utilize the catalyst at lower selective isomerization temperatures, for example, from about 250° C. to about 400° C., the combined halogen which will be utilized along with the alumina support is fluorine, and this fluorine will be utilized in an amount of from about 2.5% to about 4.5% by weight. The composite will then have the desired hydrogenation component combined therewith. This hydrogenation component will normally be selected from Groups VIB and VIII of the Periodic Table or mixtures thereof. Such hydrogenation components include chromium, molybdenum, tungsten, iron, cobalt, nickel, and the so-called platinum group metals including platinum, palladium, ruthenium, rhodium, osmium, and iridium. Of the various hydrogenation components which may be utilized, those of the platinum group metals are preferred, and of these platinum group metals, platinum itself is particularly preferred. The hydrogenation componet of these selective isomerization catalysts of the present invention will normally be utilized in an amount of from about 0.01% to about 10% by weight based on the weight of the support. With the preferred platinum group metals, particularly platinum, the quantity utilized will range from about 0.01% to about 2% by weight. A particularly preferred catalyst comprising platinum, combined halogen, and alumina will contain about 0.375% platinum, about 4.5% fluorine, and alumina.

Because of equilibrium considerations and because it is often desirable and/or advisable to carry out the selective isomerization reaction at the lowest possible temperature, for example, from about 100° C. to about 250° C., catalysts may also be prepared by impregnating composites such as described hereinabove with a metal halide of the Friedel-Crafts type at elevated temperatures. Various Friedel-Crafts metal halides may be utilized but not necessarily with equivalent results. Examples of such Friedel-Crafts metal halides include aluminum bromide, aluminum chloride, antimony pentachloride, beryllium chloride, ferric bromide, ferric chloride, gallium trichloride, stannic bromide, stannic chloride, titanium tetrabromide, titanium tetrachloride, zinc bromide, zinc chloride, and zirconium chloride. Of these Friedel-Crafts metal halides, the Friedel-Crafts aluminum halides are preferred, and aluminum chloride is particularly preferred. While the catalysts are prepared from Friedel-Crafts metal halides, they do not contain any free Friedel-Crafts metal halides as prior art catalysts of this general type have contained. During the preparation of these catalysts at elevated temperatures, the Friedel-Crafts metal halide appears to react with the refractory oxide and it is believed that the Friedel-Crafts metal halide reacts with the hydroxyl groups on the refractory oxide surface so that when the catalyst preparation is completed, the catalyst composite is free from Friedel-Crafts metal halide. For example, an excellent low-temperature selective isomerization catalyst for use in the present invention can be prepared by impregnating from about 5 to about 20% aluminum chloride onto a composite of platinum, alumina, and combined halogen at temperatures of from about 425° to about 625° C. The final catalyst composite is free from aluminum chloride, and results in a particularly preferred selective isomerization catalyst for preparing 2,3-dimethylbutane.

The selective isomerization process of the present invention can be carried out at varying conditions of temperature, pressure, space velocity, and percent conversion per pass of the neohexane to 2,3-dimethylbutane. The temperature utilized will generally be dictated by the particular catalyst selected. Thus the temperature may range over a wide range of from about 100° C. to about 500° C. The pressure will be selected so as to insure substantial vapor phase operation and depending upon the particular temperature utilized will range from about atmospheric pressure to about 150 atmospheres or more. Liquid hourly space velocity will range from about 0.1 to about 20 or more. Hydrogen is utilized to minimize cracking and to maintain the surface of the catalyst in a substantially carbon-free condition. The quantity of hydrogen utilized will range from about 0.25 to about 10 moles or more of hydrogen per mole of hydrocarbon. Hydrogen consumption will be exceedingly small, in the range of from about 30 to about 75 cubic feet per barrel of hydrocarbon feed.

The process of the present invention may be effected in any suitable manner and may comprise either a batch or a continuous type operation. A particularly preferred continous method of operation comprises isomerizing a hexane feed in a reaction zone containing an isomerization catalyst as hereinabove described, taking the reaction zone effluent and passing the same to a neohexane fractionation column, taking a neohexane cut overhead and recycling it to a point in the isomerization reactor so that not more than 25% conversion of the neohexane occurs in the reactor thereafter, taking the bottoms cut from the neohexane fractionation column and passing the same to a second fractional column, taking an overhead cut comprising 2,3-dimethylbutane and controlled amounts of methylpentanes from the second fractionation column, and recycling the neohexane formed as a result of the preliminary isomerization to extinction with formation of over 70% of 2,3-dimethylbutane being obtained. Further quantities of 2,3-dimethylbutane may be formed by recycle of the methylpentane-normal hexane cut to the inlet of the isomerization reactor so that ultimately 2,3-dimethylbutane is the sole major product of the hexane isomerization.

Other continuous types of operation which may be used in this process include the compact moving bed type of operation in which the bed of catalyst and the reactant pass either concurrently or countercurrently to each other in the reaction zone, and the slurry type operation in which the catalyst is carried into the reaction zone as a slurry in the neohexane charge.

The following examples are given to illustrate our invention but are not introduced with the purpose of unduly limiting the same.

*Example 1*

One specific example of the operation of the selective isomerization process with an alumina-platinum-combined halogen catalyst is described herewith. The catalyst comprises alumina containing about 0.375% by weight platinum and about 0.6% by weight combined halogen. The combined halogen comprises about 0.3% combined fluorine and about 0.3% combined chlorine.

This example illustrates the selective isomerization of neohexane to 2,3-dimethylbutane. The neohexane is charged to a fixed-bed type reactor which contains 100 cc. of the above-described catalyst disposed therein. The reactor is maintained at about 400° C. and about 500 p.s.i.g. The percent neohexane converted is limited to less than 25%. The yield of 2,3-dimethylbutane obtained based on neohexane converted, is greater than about 73%. Formation of other hexane isomers is controlled so that the 2,3-dimethylbutane is the major product formed.

*Example II*

Another specific example of the operation of the selective isomerization process with an alumina-platinum-combined halogen catalyst is described herewith. The catalyst comprises alumina containing about 0.375% by weight platinum and about 4.5% by weight combined fluorine.

This example again illustrates the selective isomerization of neohexane to 2,3-dimethylbutane. The neohexane is charged to a fixed-bed type reactor which contains 100 cc. of the above-described catalyst disposed therein. The reactor is maintained at about 280° C. and about 500 p.s.i.g.. The percent neohexane converted is limited to less than 20%. The yield of 2,3-dimethylbutane obtained is greater than about 78%. Formation of other hexane isomers is controlled so that the 2,3-dimethylbutane is the major product formed.

*Example III*

A still further specific example of the operation of the process with an alumina-platinum-combined halogen catalyst containing combined aluminum chloride is described herewith. The catalyst comprises a support of alumina containing about 0.375% by weight platinum, about 0.3% fluorine and about 0.25% chlorine, said support having been impregnated with about 17% by weight of aluminum chloride at 550° C. and thereafter swept with a stream of dry nitrogen at the same temperature to remove excess unreacted aluminum chloride.

In this example, neohexane is again selectively isomerized to 2,3-dimethylbutane. The neohexane is charged to a fixed-bed type reactor which contains 100 cc. of the above-described catalyst disposed therein. The reactor is maintained at about 150° C. and about 500 p.s.i.g. The percent neohexane converted is limited to less than 10%. The yield of 2,3-dimethylbutane obtained is greater than about 90%. Formation of other hexane isomers is controlled so that the 2,3-dimethylbutane is the major product formed.

We claim as our invention:

1. A process for the production of 2,3-dimethylbutane which comprises selectively isomerizing neohexane at an isomerization temperature of from about 100° C. to about 500° C. and a pressure of from about atmospheric to about 150 atmospheres in the presence of an isomerization catalyst comprising a refractory oxide, a hydrogenating metal and combined halogen, and limiting the once-through conversion of neohexane to 2,3-dimethylbutane to less than about 25%.

2. A process for the production of 2,3-dimethylbutane which comprises selectively isomerizing neohexane at an isomerization temperature or from about 100° C. to about 500° C. and a pressure of from about atmospheric to about 150 atmospheres in the presence of an isomerization catalyst comprising a refractory oxide, a platinum group metal and combined halogen and limiting the once-through conversion of neohexane to 2,3-dimethylbutane to less than about 25%.

3. A process for the production of 2,3-dimethylbutane which comprises selectively isomerizing neohexane at an isomerization temperature of from about 100° C. to about 500° C. and a pressure of from about atmospheric to about 150 atmospheres in the presence of an isomerization catalyst comprising alumina, a platinum group metal and combined halogen and limiting the once-through conversion of neohexane to 2,3-dimethylbutane to less than about 25%.

4. A process for the production of 2,3-dimethylbutane which comprises selectively isomerizing neohexane at an isomerization temperature of from about 100° C. to about 500° C. and a pressure of from about atmospheric to about 150 atmospheres in the presence of an isomerization catalyst comprising alumina, platinum and combined halogen and limiting the once-through conversion of neohexane to 2,3-dimethylbutane to less than about 25%.

5. The process of claim 1 further characterized in that said once-through conversion of neohexane is limited to less than about 20%.

6. The process of claim 1 further characterized in that said isomerization catalyst comprises alumina, from about 0.01% to about 2% by weight thereof of platinum, and from about 0.1% to about 8% by weight thereof of combined halogen.

7. The process of claim 4 further characterized in that said combined halogen is a mixture of chlorine and fluorine in an amount of from about 0.3% to about 0.7% by weight, and that the selective isomerization is carried out at a temperature of from about 300° C. to about 500° C. and at a pressure of from about atmospheric to about 150 atmospheres.

8. The process of claim 4 further characterized in that said combined halogen is fluorine in an amount of from about 2.5% to about 4.5% by weight, and that the selective isomerization is carried out at a temperature of from about 250° C. to about 400° C. and at a pressure of from about atmospheric to about 150 atmospheres.

9. The process of claim 4 further characterized in that the catalyst is impregnated with from about 5% to about 20% by weight of a Friedel-Crafts metal halide at a temperature of about 425° to about 625° C. and that the selective isomerization is carried out at a temperature of from about 100° to about 250° C. and at a pressure of from about atmospheric to about 150 atmospheres.

10. The process of claim 9 further characterized in that the Friedel-Crafts metal halide is aluminum chloride.

References Cited by the Examiner

UNITED STATES PATENTS

| | | | |
|---|---|---|---|
| 2,436,923 | 3/48 | Haensel | 260—666 |
| 2,900,425 | 8/59 | Block et al. | 260—666 |
| 2,908,735 | 10/59 | Haensel | 260—683.68 |
| 2,938,936 | 5/60 | Belden | 260—683.68 |
| 2,952,716 | 9/60 | Haensel | 260—683.65 X |
| 2,993,938 | 7/61 | Block et al. | 260—666 |
| 2,999,074 | 9/61 | Block et al. | 252—442 |

FOREIGN PATENTS 823,010  11/59  Great Britain.

OTHER REFERENCES

Egloff et al.: Isomerization of Pure Hydrocarbons, Reinhold Publishing Corp., New York (1942); pp. 33 and 34 relied upon.

ALPHONSO D. SULLIVAN, *Primary Examiner.*